(12) United States Patent
Donlin

(10) Patent No.: US 7,805,593 B1
(45) Date of Patent: Sep. 28, 2010

(54) REAL-TIME PERFORMANCE MONITORING USING A SYSTEM IMPLEMENTED IN AN INTEGRATED CIRCUIT

(75) Inventor: Adam P. Donlin, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 220 days.

(21) Appl. No.: 11/090,627

(22) Filed: Mar. 24, 2005

(51) Int. Cl.
    *G06F 9/00* (2006.01)
(52) U.S. Cl. .................................... 712/227
(58) Field of Classification Search .................. 712/227
    See application file for complete search history.

(56) References Cited

U.S. PATENT DOCUMENTS

| | | | |
|---|---|---|---|
| 5,914,616 A | 6/1999 | Young et al. | |
| 6,415,378 B1 * | 7/2002 | Davidson et al. | 712/207 |
| 6,658,564 B1 * | 12/2003 | Smith et al. | 713/100 |
| 2002/0038416 A1 * | 3/2002 | Fotland et al. | 712/228 |
| 2003/0069724 A1 * | 4/2003 | Schubert et al. | 703/16 |

OTHER PUBLICATIONS

Tanenbaum, "Structured Computer Organization", 1984, Prentice-Hall, Second Edition, pp. 10-12.*
U.S. Appl. No. 10/812,643, filed Mar. 29, 2004, Donlin et al.
U.S. Appl. No. 10/912,844, filed Aug. 6, 2004, Ansari et al.
U.S. Appl. No. 10/912,865, filed Aug. 6, 2004, Purcell et al.
Ahmad Ansari et al.; "Accelerated System Performance with APU-Enhanced Processing"; Xcell Journal; First Quarter 2005; Jan. 2005; available on line from Xilinx, Inc.
Xilinx, Inc.; "The Programmable Logic Data Book 2000"; Apr. 2000; available from Xilinx, Inc.; 2100 Logic Drive, San Jose, California 95124; pp. 3-75 through 3-96.
International Business Machines Corporation, "PPC405Fx Embedded Processor Core User's Manual," SA14-2764-00, Jan. 28, 2005, pp. 1-553, available from IBM Microelectronics Division, 1580 Route 52, Bldg. 504, Hopewell Junction, NY 12533-6351, USA.
Xilinx, Inc., "Virtex-II Platform FPGA Handbook," UG002 (v1.0), Dec. 6, 2000, pp. 33-75 (46 total), available from Xilinx, Inc., 2100 Logic Drive, San Jose, CA 95124, USA.
Xilinx, Inc., "Virtex-II Pro Platform FPGA Handbook," UG012 (v2.0), Oct. 14, 2002, pp. 19-71 (56 total), available from Xilinx, Inc., 2100 Logic Drive, San Jose, CA 95124, USA.

* cited by examiner

*Primary Examiner*—Eddie P Chan
*Assistant Examiner*—John Lindlof
(74) *Attorney, Agent, or Firm*—W. Eric Webostad; John J. King

(57) ABSTRACT

Apparatus and method for performance monitoring is described. Instances of performance monitors are loaded into configurable resources. The performance monitors are coupled to a processor via an auxiliary processor unit or a debug port to obtain processor pipeline execution status. Real-time threads or processes are loaded into memory for execution by the processor. The performance monitors are used to monitor the execution status of the real-time threads or processes executed by the processor.

15 Claims, 8 Drawing Sheets

REAL-TIME PERFORMANCE MONITORING USING A SYSTEM IMPLEMENTED IN AN INTEGRATED CIRCUIT

FIELD OF THE INVENTION

One or more aspects of the invention relate generally to performance monitoring in a programmable logic device.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

One such FPGA, the Xilinx Virtex® FPGA, is described in detail in pages 3-75 through 3-96 of the Xilinx 2000 Data Book entitled "The Programmable Logic Data Book 2000" (hereinafter referred to as "the Xilinx Data Book"), published April, 2000, available from Xilinx, Inc., 2100 Logic Drive, San Jose, Calif. 95124. (Xilinx, Inc., owner of the copyright, has no objection to copying these and other pages referenced herein but otherwise reserves all copyright rights whatsoever.) Young et al. further describe the interconnect structure of the Virtex FPGA in U.S. Pat. No. 5,914,616, issued Jun. 22, 1999 and entitled "FPGA Repeatable Interconnect Structure with Hierarchical Interconnect Lines."

Another such FPGA, the Xilinx Virtex®-II FPGA, is described in detail in pages 33-75 of the "Virtex-II Platform FPGA Handbook", published December, 2000, available from Xilinx, Inc., 2100 Logic Drive, San Jose, Calif. 95124. And yet another such FPGA, the Xilinx Virtex-II Pro™ FPGA, is described in detail in pages 19-71 of the "Virtex-II Pro Platform FPGA Handbook", published Oct. 14, 2002 and available from Xilinx, Inc., 2100 Logic Drive, San Jose, Calif. 95124.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block." Heretofore, performance of a design instantiated in programmably configurable circuitry of an FPGA ("FPGA fabric") which communicated with an embedded microprocessor was evaluated at a high-level, namely performance monitoring has relied upon monitoring the design instantiated in the FPGA fabric with limited performance monitoring of supporting circuitry embedded in the FPGA, including performance monitoring of the embedded processor. Accordingly, it would be desirable and useful to understand performance issues within or at the level of interaction with an embedded processor in an FPGA.

Generally, monitoring of a processor block means use of specialized code that executes in the processor along with application code or a small number of specific hardware resources within the processor block itself. Monitoring performance of execution of an instruction using software monitoring code alone may not reach down to per-clock cycle behavior monitoring of the processor executing such instruction. Accordingly, it would be desirable and useful to monitor performance at a more real-time execution level during runtime of an instruction than software monitoring code alone.

SUMMARY OF THE INVENTION

One or more aspects of the invention generally relate to performance monitoring in a programmable logic device.

An aspect of the invention is a method for performance monitoring, including: instantiating performance monitors in configurable logic; coupling the performance monitors to a processor via an auxiliary processor unit to obtain processor pipeline execution status; loading real-time threads into memory; executing the real-time threads with the processor; and monitoring with the performance monitors the execution status of the real-time threads executed by the processor.

Another aspect of the invention is a programmable logic device system, including: at least one performance monitor instantiated in configurable logic; an auxiliary processing unit coupled to the at least one performance monitor; and a processor coupled to the auxiliary processing unit, where the auxiliary processing unit is coupled to obtain execution status of an instruction processed in a pipeline of the processor. The auxiliary processing unit is configured to provide the execution status of the instruction to the at least one performance monitor for real-time performance monitoring.

Yet another aspect of the invention is a programmable logic device, including: at least one performance monitor instantiated in configurable logic; and a processor having a debug port, where the debug port is coupled to provide execution status of an instruction processed in a pipeline of the processor. The debug port is configured to provide the execution status of the instruction to the at least one performance monitor for real-time performance monitoring.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items, however, in alternative embodiments the items may be different.

Figure 1:
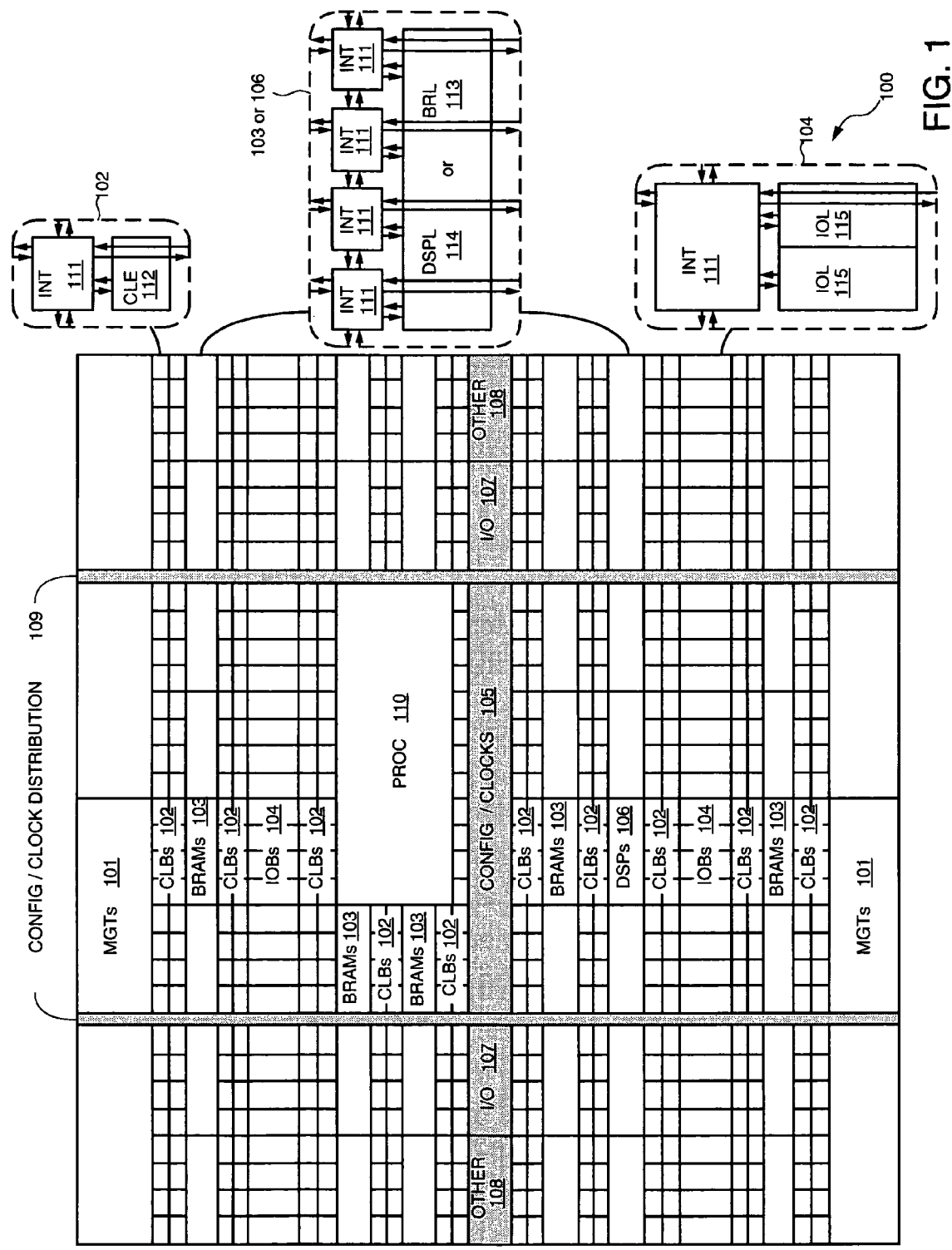
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic. An example of a columnar architected FPGA is the Virtex 4 FPGA chip available from Xilinx, Inc. of San Jose, Calif.

FPGA 100 illustratively represents a columnar architecture, though FPGAs of other architectures, such as ring architectures for example, may be used.

Figure 2:
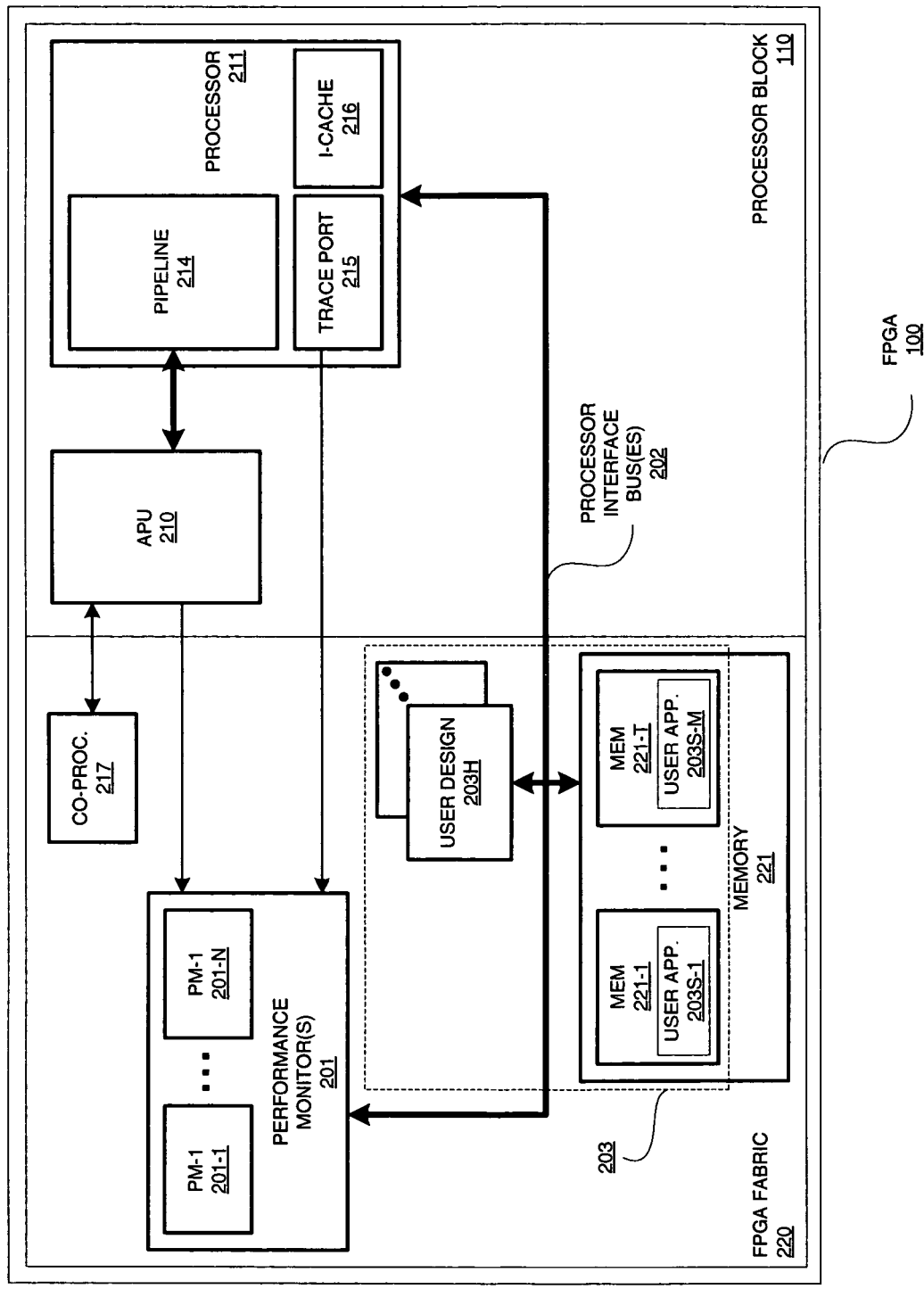
FIG. 2 is a simplified block diagram of an exemplary embodiment of an FPGA having instantiated in FPGA fabric a user design.

FIG. 2 is a simplified block diagram of an exemplary embodiment of an FPGA 100 having instantiated in FPGA fabric 220 a user design 203. User design 203 include a user design 203H instantiated in programmably configurable logic of FPGA fabric 220, or may be a hybrid design, namely having a portion 203H instantiated in programmably configurable logic of FPGA fabric 220 and having a user application portion 203S stored in one or more memories 221. A user design may employ embedded resources of FPGA 100, including an embedded microprocessor.

In processor block 110, embedded circuitry may include Auxiliary Processing Unit controller ("APU controller") 210 and one or more embedded microprocessors, such as processor 211. Processor 211 may include a processor pipeline 214, trace port 215, and instruction cache 216. Processor 214 may be a PowerPC 405 core embedded in FPGA 100. Trace port 215 is a trace status interface facilitating tracing of code running in real time.

Trace port 215 outputs data responsive to trace code running on processor 211. Trace code is code, which may include specific instructions, that causes trace port 215 of processor 211 to emit information. Accordingly, the result of trace code executed on processor 211, which may include instruction code executed out of instruction cache 216, provides information as to operation of processor 211 in response to running such trace code.

Additional details regarding PowerPC 405 core may be found in part in "PowerPC 405 Embedded Processor Core User's Manual" by International Business Machines [online] (December, 2001)<URL:www-3.ibm.com/chips/techlib/techlib.nsf/techdocs/D060
DB54BD4DC4F2872569D2004A30 D6/$file/405_um.pdf>.

Processor pipeline 214 may be coupled to APU controller 210. APU controller 210, which may be found in FPGAs from Xilinx of San Jose, Calif., is described in additional detail in a U.S. patent application Ser. No. 10/912,844, now U.S. Pat. No. 7,346,759, filed Aug. 6, 2004 entitled "Coprocessor Interface Controller" by Ahmad R. Ansari et al. which is herein incorporated by reference, as well as in: "Accelerated System Performance with APU-Enhanced Processing" by Xilinx, Inc. [online] (January, 2005)<URL.www.xilinx.com/ publications/xcellonline/xcell_52/xc_pdf/ xc_v4acu52.pdf>, and "Virtex-4 Family Overview" by Xilinx, Inc. [online] (December, 2004) <URLhttp:// www.xilinx.com/bvdocs/publications/ds112.pdf>.

Though APU controller 210 provides an interface to a coprocessor 217 instantiated in FPGA fabric 220, it should be appreciated that APU controller 210's coupling to pipeline 214 provides access to execution status, for example, command execution status, of instructions being processed by pipeline 214. For example, information as to whether an instruction has stalled, the location of an instruction within pipeline 214, and other information may be obtained via APU controller 210 with regard to an instruction being processed by pipeline 214. Thus, it should be appreciated that APU controller 210 provides an interface to FPGA fabric 220 for obtaining information regarding the processing of one or more instructions by a pipeline of an embedded processor, such as embedded processor 211.

It should be appreciated that APU controller 210 provides a coupling of configurable logic in FPGA fabric 220 with execution of instructions ("computations") occurring in an embedded processor, such as embedded processor 211. Notably, APU controller 210 does not necessarily provide a coupling of all computations by embedded processor 211, though APU controller 210 may provide a significant subset of such computations. Thus, using APU controller 210, not necessarily for a coprocessor 217 instantiated in FPGA fabric 220, but for observing instruction sequences about to be decoded or decoded, which may or may not include subsequent execution, within processor 211, facilitates obtaining performance information in real-time regarding instruction process flow. Thus, not all control signals of an embedded processor 211 need be exposed via APU controller 210, though APU controller 210 exposes a significant amount of instruction sequences flowing through pipeline 214.

Notably, if an instruction is not in a set of instructions APU controller 210 processes, it will not be decoded by APU controller 210, which too may be tracked. APU controller 210 may still track execution status of an instruction in pipeline 214 whether or not it is decoded by APU controller 210. Notably, there may be an instruction which is not within a set of instructions for either APU controller 210 or processor 211, such instruction may be provided to software for processing, as is known.

APU controller 210 is coupled to one or more performance monitors 201 instantiated in FPGA fabric 220. Alternatively, or in combination therewith, one or more performance monitors 201 may be coupled to trace port 215.

It should be appreciated that for a Real-Time Operating System ("RTOS"), it is desirable to extract statistics about execution state of a system in real-time. These statistics facilitate a real-time kernel to be enhanced based on insight obtained from such statistics extracted associated with execution state of a system. In other words, runtime performance of a system may be enhanced by identification of whether real-time deadlines are or are not being met, and why such deadlines are or are not being met. To facilitate real-time kernel enhancement, information may be collected by event counters instantiated as performance monitors 201 within FPGA fabric 220. Notably, the number, N, of performance monitors 201, whether counters, triggers or other types of event monitors, may be made substantially larger than the number of those monitors that may be embedded within processor 211 by virtue of the number of programmably configurable resources of FPGA fabric 220. In other words, there may be many more performance monitors 201 than embedded monitors in processor 211.

Using FPGA fabric 220 to instantiate performance monitors 201 facilitates greater diversity, as well as enhanced access and flexibility, for monitoring events and collecting statistics. Thus, performance monitors 201 may for example include registers or counters, which by being instantiated in configurable logic of FPGA fabric 220 have little if any impact on executing instructions in processor 211. Moreover, performance monitor 201 configured circuitry in FPGA fabric 220 may be used for detecting events on a per clock cycle basis to facilitate RTOS operation. Data calculation may be accelerated by calculating statistical data in performance monitor 201 configured circuitry in FPGA fabric 220 which too may facilitate RTOS operation. Furthermore, statistical data obtained may be stored in performance monitor 201 configured circuitry in FPGA fabric 220 for subsequent processing by one or more performance monitors 201 to further facilitate RTOS operation.

Accordingly, dynamic instruction stream analysis via APU controller 210 is further described. APU controller 210 is employed to enhance visibility into execution in pipeline 214 to observe what instructions are being executed and monitoring of other control signals through APU controller 210. APU controller 210 is coupled to one or more performance monitors 201 instantiated in programmably configurable logic for monitoring events, such as what instructions are being executed and other control signals, for statistical analysis. Such statistical analysis may include data gathering, as well as calculation of RTOS statistics, in programmably configurable logic. Notably, because configurable logic is programmed, partitioning of performance monitors may be substantially granular, namely per-instruction monitoring or per-clock cycle monitoring. Moreover, generation of statistics may be done with multiple statistical calculations being triggered and effected by having multiple performance monitors 201. Notably, such generation of statistics need not be done serially, but may involve parallel triggering or calculating. It should be appreciated that such partitioning promotes tracing, such as instruction execution, at a more granular level, which may lead to more accurate characterization of RTOS operation.

Accordingly, a user may have a candidate for hardware and a candidate for software, and desire to understand the interaction of the two candidates. For example, a user may desire to adjust the partitioning of the software or to adjust the architecting of the hardware, or a combination thereof, to "tune" for enhanced performance to account for interaction with a processor, such as an embedded processor 211. Moreover, a user may partition the hardware, such as a user instantiated deign 203H, to further observe performance.

Notably, an embedded processor 211 need not be employed. For example, APU controller 210 may be coupled to an external processor, as an FPGA may have an externally accessible interface for coupling a processor. Moreover, it should be understood that APU controller 210 may be a separate external integrated circuit. Furthermore, it should be understood that any integrated circuit having configurable logic that may be coupled to a processor pipeline via an APU controller may be used. However, for purposes of clarity, it will be assumed that an embedded processor and APU controller are used.

Figure 3:
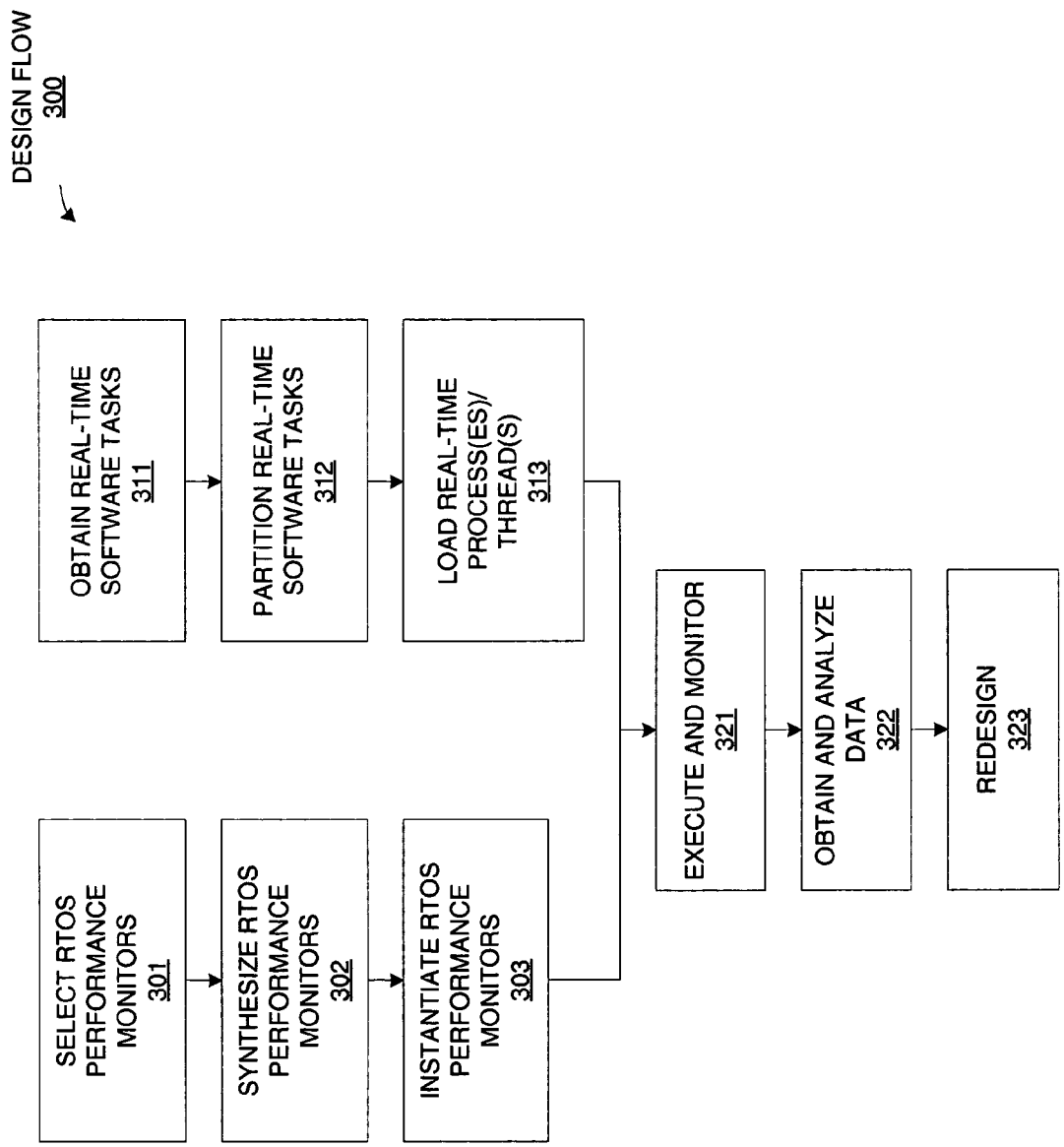
FIG. 3 is a simplified flow diagram depicting an exemplary embodiment of a design flow for a real-time application.

FIG. 3 is a simplified flow diagram depicting an exemplary embodiment of a design flow 300 for a real-time application. Design flow 300 has a software portion, which may include operations 311, 312 and 313, and a hardware portion, which may include operations 301, 302 and 303. The hardware portion and the software portion are combined for a performance enhancement portion, which may include operations 321, 322 and 323.

At 301, RTOS performance monitors are selected for monitoring real-time software tasks. Notably, these real-time software tasks may be generated by partitioning a larger task or tasks, such as at 312.

At 302, the RTOS performance monitors selected at 301 are synthesized. Synthesizing RTOS performance monitors is done as a precursor to instantiation in programmably configurable logic of a programmable logic device. Notably, RTOS performance monitors may be synthesized for particular RTOS performance monitoring to be employed. In other words, custom performance monitors for particular software tasks may be used. Alternatively, or in addition to custom performance monitors, a library of performance monitors may be accessible. Such library of performance monitors may be used to select RTOS performance monitors at 301, and thus synthesis would have previously been done and operation 302 need not be repeated. Alternatively, such library may have parameterizable performance monitor blocks that may be elaborated upon by a user at 302 and subsequently synthesized for use in configurable logic.

At 303, synthesized RTOS performance monitors are instantiated in configurable logic. In FIG. 2, these RTOS performance monitors are illustratively shown as performance monitors 201-1 through 201-N, for N a positive integer.

Returning to FIG. 3, the software portion of design flow 300 includes obtaining real-time software tasks at 311. These real-time software tasks are partitioned at 312.

At 313, real-time process(es) or thread(s), identified responsive to partitioning at 312, are loaded into application memory, which memory may be internal or external to a programmable logic device. For purposes of clarity, it will be assumed that such application memory is internal to a programmable logic device. The process(es) or thread(s) loaded are obtained from those partitioned real-time software tasks of operation 312.

In FIG. 2, user applications 203S-1 through 203S-M, for M a positive integer, are respective real-time process(es) or thread(s) loaded into application memory 221. Memory 221 may be a single memory or a plurality of memories, such as memories 221-1 through 221-T, for T a positive integer. It may be that a user wants to monitor performance of processor 211 in the execution of loaded real-time process(es) or thread(s) solely of a software program. However, a user may desire to do monitoring of a hybrid design. A hybrid design includes both a user design 203H instantiated in configurable logic, in addition to one or more user applications 203S, which are software applications. Thus, execution of one or more instructions associated with one or more process(es) or thread(s) by processor 211, and with interaction of a user-instantiated design 203H, may be monitored using one or more performance monitors 201. Moreover, a user may instantiate a user design 203H, and test operation of such user design 203H in response to one or more user applications 203S, where such user applications may or may not be part of the final product.

With continuing reference to FIG. 2 and renewed reference to FIG. 3, design flow 300 is further described. At 321, application code interspersed with performance monitoring instruction sequences is executed. At 321, the hardware and software portions instantiated/loaded at 303 and 313, respectively, facilitate execution of process(es) or thread(s) or both for monitoring of performance of processor 211. More particularly, pipeline 214 executing such process(es) or thread(s) is monitored by performance monitors 201.

At 322, data may be obtained and analyzed as previously described herein using performance monitors 201. At 323, it may be determined whether a design needs to be redesigned to improve performance. For example, it may be determined whether an instruction is stalling for a process or task, and whether such stalling may be overcome by using separate as opposed to a single memory or thread. This is merely one example of where an RTOS system may be performance enhanced using data obtained and analyzed with design flow 300.

Figure 4:
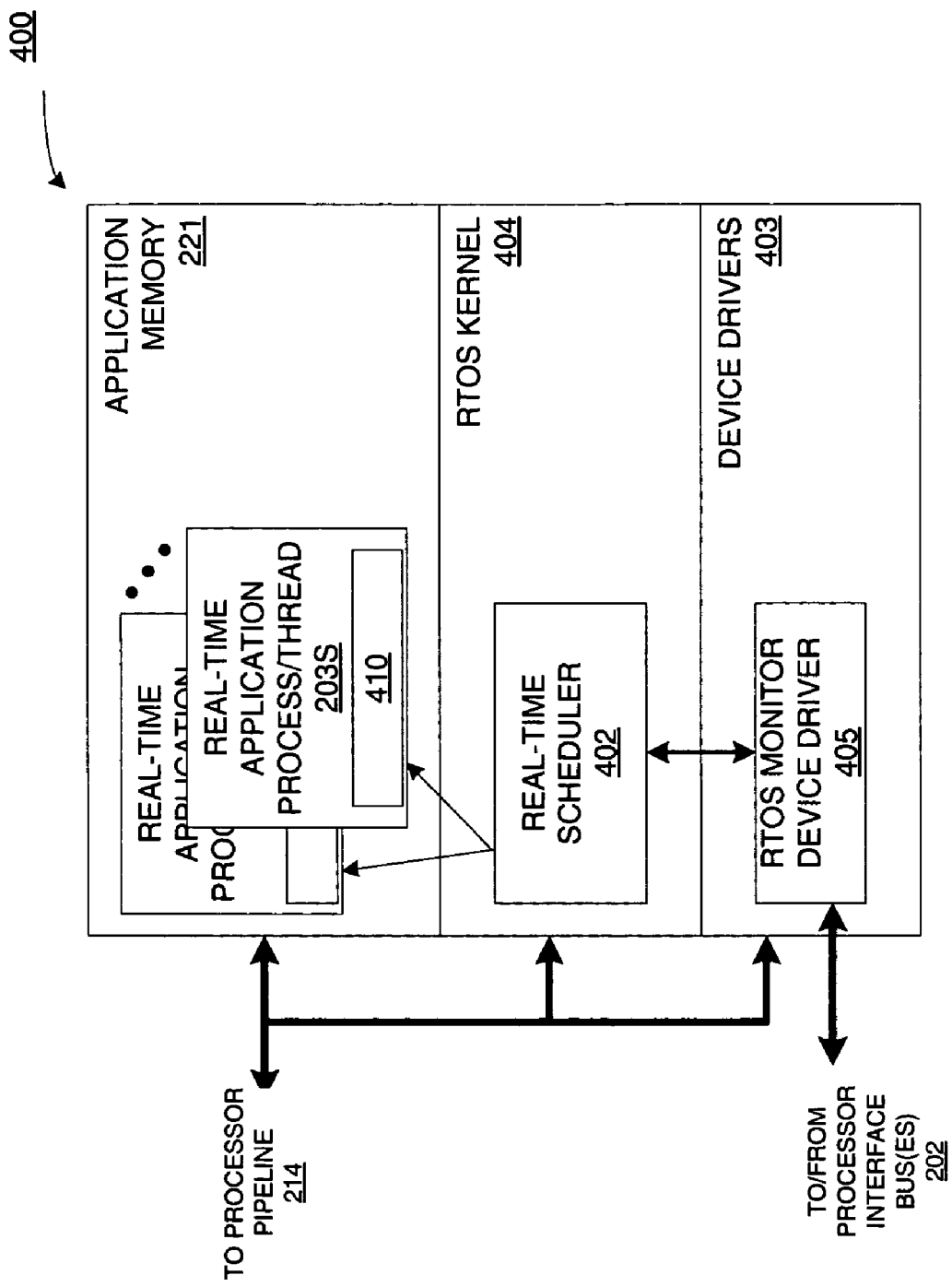
FIG. 4 is a simplified block diagram depicting an exemplary embodiment of a software/hardware infrastructure for real-time operating system ("RTOS") performance monitoring.

FIG. 4 is a simplified block diagram depicting an exemplary embodiment of a software architecture with interfaces to hardware to provide infrastructure 400 for RTOS performance monitoring. For infrastructure 400, real-time application processes are interfaced directly to processor pipeline 214, and software layers 221, 404, and 403 execute on processor pipeline 214 and thus may be coupled to such pipeline. Infrastructure 400 includes application memory 221 having one or more real-time application process(es) or thread(s) 203S. These process(es) or thread(s) 203S are provided to processor pipeline 214 for execution of instructions associated therewith. Thus, performance monitoring of a sequence of instructions may occur.

However, in order to more clearly understand where a processor pipeline is with respect to executing a sequence of instructions or an instruction, a flag or tag instruction may be added. For example, a performance monitor section of code 410 may be added to a real-time application process or thread 203S. This section of code 410 could be identified for registering in a register of a performance monitor instantiated in configurable logic. Notably, by including a flag or tag instruction in an application, rather than using a lengthy performance monitoring application, system performance may be observed using at least a near approximation of an application for which the system will be used. In other words, inclusion of a performance monitor section of code 410 may be substantially unobtrusive, inducing little change in timing with respect to performance of an application without such performance monitor section of code 410. Notably, introduction of performance monitoring code may alter one or more of behavior and timing of a system. However, if there is sufficient slack time in timing targets of a real time application, such added performance monitoring code will not adversely impact the performance of the system. It should be appreciated that it is unlikely that every, or even a majority, of processes or threads have enough slack time to allow full instrumentation of its performance. However, performance monitoring is facilitated by having registers external to a processor pipeline, as opposed to dedicated registers in a processor, in which to capture performance information.

Execution of such processes or threads 203S is scheduled by real-time scheduler 402. Real-time scheduler 402 may exist within an RTOS kernel 404. Notably, RTOS kernel 404, as well as its constituent device drivers, may be executed from system memory. Such system memory may be shared with an application or it may be dedicated to execution of RTOS kernel 404. Thus, for example, RTOS kernel 404 may be located in application memory 221, though it is separated out in FIG. 4 for purposes of clarity. In order to know when to schedule a process or thread 203S, real-time scheduler 402 may be in communication with an RTOS monitor device driver 405 of device drivers 403. Thus, real-time scheduler 402 may be responsive to output from an RTOS performance monitor under control of RTOS kernel 404. Notably, RTOS scheduler 402 may have one timing target or threshold which is propagated to generate multiple timing targets or thresholds for different triggering levels for a plurality of performance monitors 201.

Referring back to FIG. 2, it should be understood that performance monitors 201 are coupled to processor 211 by one or more processor interface busses 202. RTOS monitor device driver 405 may be in communication with one or more performance monitors 201 vis á vis one or more processor interface busses 202 in order to determine whether a thread or process has completed execution, for example, or other information which would be beneficial for real-time scheduler 402. A device driver 405 is a low-level program that may be used to read from and write to configuration memory employed to instantiate performance monitors 201.

Accordingly, it should be appreciated that at various points in time, real-time scheduler 402 or other control algorithms of a RTOS may inspect, manipulate, and reset statistical data accumulated in performance monitors 201 instantiated in FPGA logic coupled to APU controller 210. The inspecting, manipulating, and resetting of such statistical data accumulated may be done under the control of RTOS monitor device driver 405 vis á vis one or more processor interface buses 202. Again, examples of such processor interface buses include a processor local bus, an on-chip memory controller bus, a device control register bus, an on-chip peripheral bus, a media-independent interface bus, among other known busses. Notably, such other known buses include industry standard buses that may be implemented within an FPGA to couple processor 211 to performance monitors 201, the latter of which may perform statistical calculations, as previously mentioned.

It should be appreciated that the degree of observance into operation of pipeline 214 facilitated by APU controller 210 allows a user to construct custom monitors which may be instantiated in configurable logic to monitor performance of a software application, a user-instantiated design, or a hybrid software application/user-instantiated design. The degree of customization ranges from selecting monitors that observe specific features of an RTOS through to specific features of actual real-time application software executing on an RTOS kernel.

Accordingly, it should be appreciated that the range of hardware monitoring functionality available for a processor core embedded in a programmable logic device, or other integrated circuit having programmable logic provides more flexibility over more general performance monitors embedded in a processor. Moreover, because APU controller 210 is instantiated in embedded or dedicated logic of an application-specific integrated circuit block 110 of FPGA 100, APU controller 210 can operate at the same frequency of operation of processor 211 without having to slow down to a frequency of operation of FPGA fabric 220. Accordingly it should be appreciated that processor 211 may be operated at or close to its core frequency of operation with monitoring logic instantiated in configurable logic attached thereto via APU controller 210, where such monitoring logic, such as performance monitors 201, provide customized statistics back to an RTOS, and more particularly, a real-time application developer.

Returning to FIG. 2, it should be understood that use of performance monitors 201 instantiated in programmably configurable logic is not limited to interfacing to APU controller 210, but performance monitors 201 may be interfaced to a trace port, such as trace port 215, for collecting data for statistical evaluation. Notably, other known debug ports, other than trace port 215, of processor 211 may be used. For example, in a hybrid hardware-software user design, an innocuous instruction in software may be used to trigger a performance monitor 201 via trace port 215. For example, writing to an on-chip memory controller of processor 211 may be such an innocuous instruction. Moreover, it should be understood that either or both trace port 215 and APU controller 210 may be used for performance monitoring.

Figure 5:
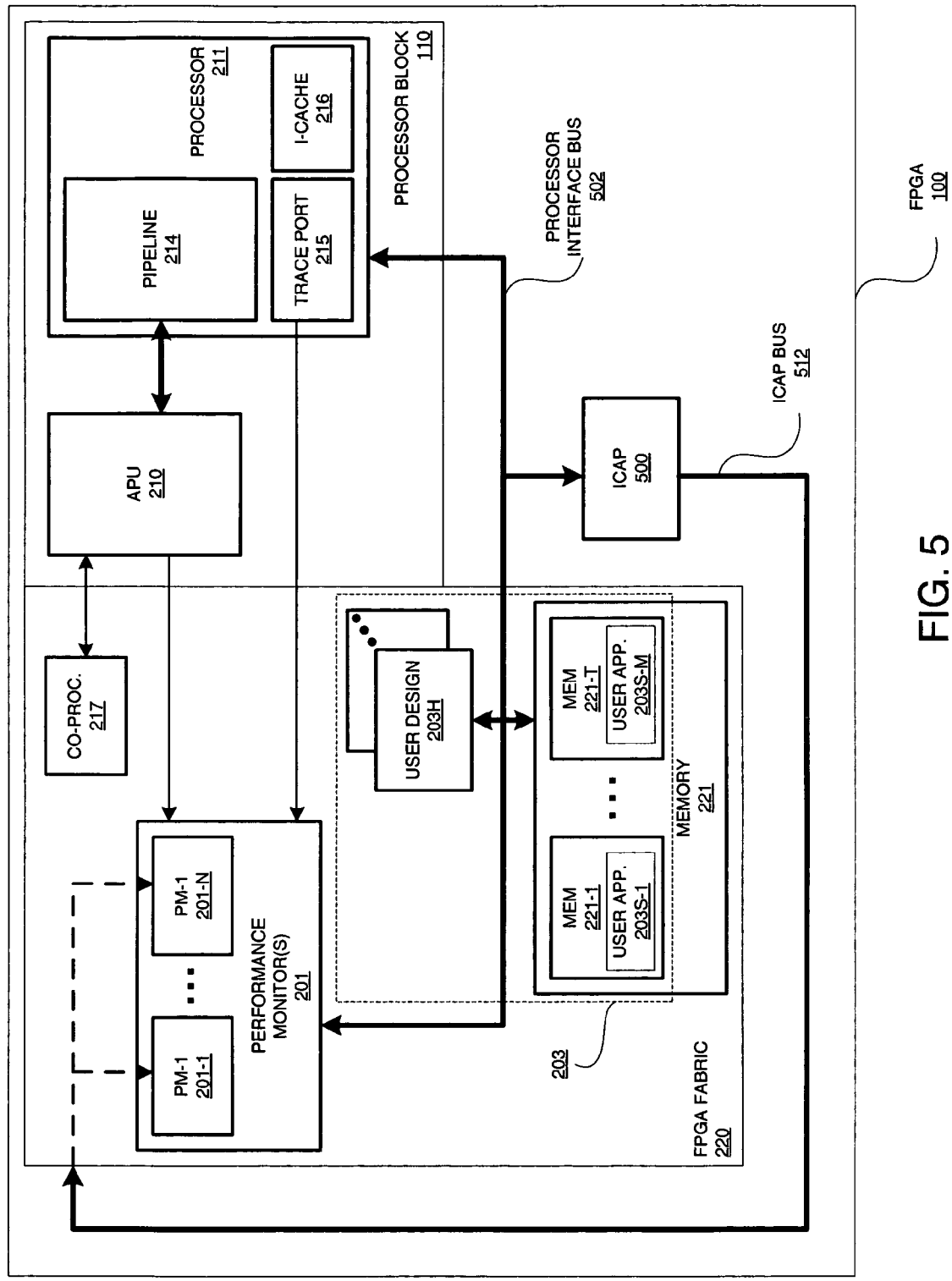
FIG. 5 is a simplified block diagram of an exemplary alternate embodiment of an FPGA having instantiated in FPGA fabric a user design.

FIG. 5 is a simplified block diagram of an exemplary alternate embodiment of an FPGA 100 having instantiated in FPGA fabric 220 a user design 203. In this embodiment, an internal configuration access port ("ICAP") 500, including an ICAP controller, which may be found in FPGAs from Xilinx of San Jose, Calif., is coupled to FPGA fabric 220 and processor 221.

Figure 6:
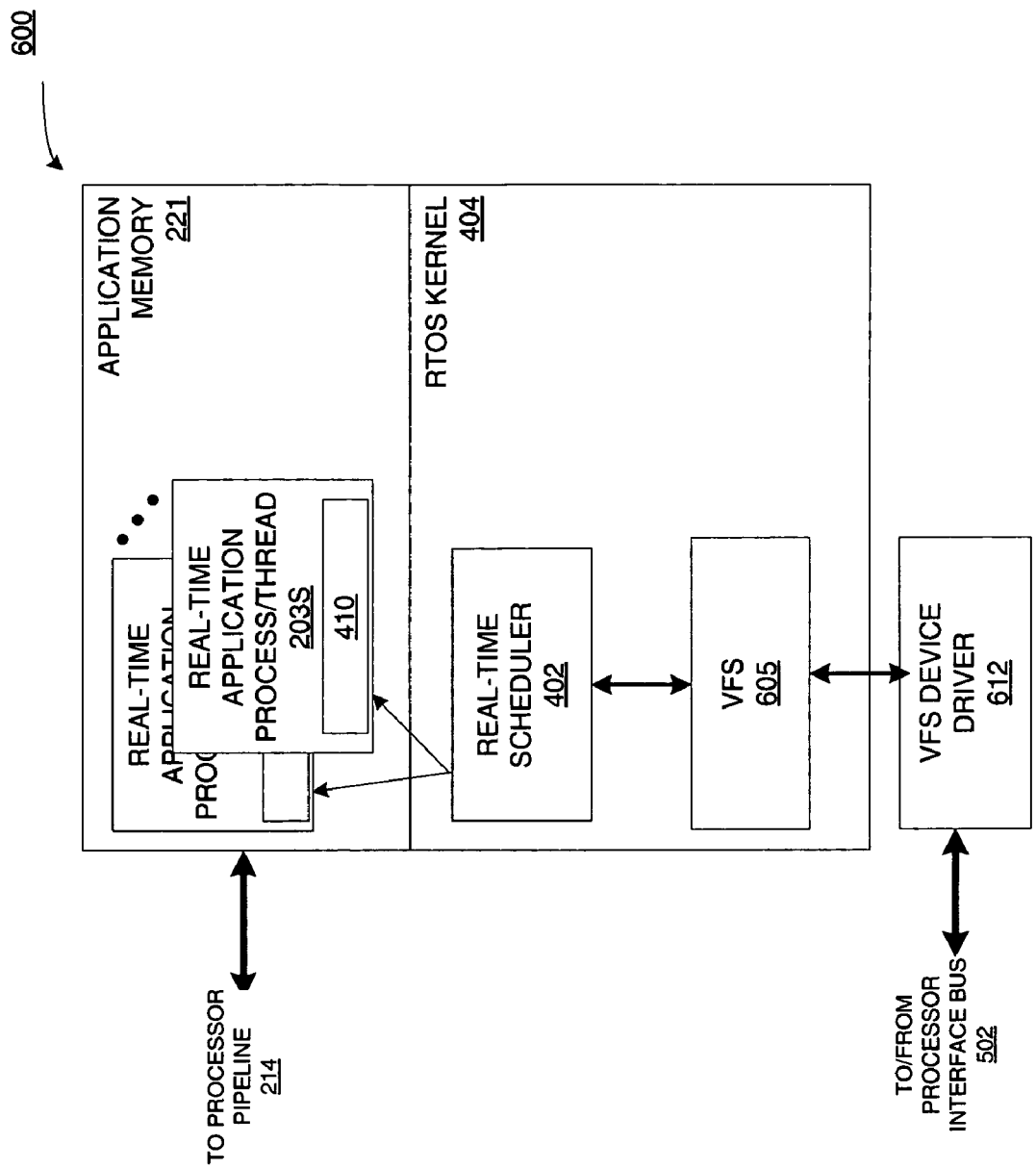
FIG. 6 is a simplified block diagram depicting an exemplary alternate embodiment of a RTOS infrastructure for RTOS performance monitoring.

FIG. 6 is a simplified block diagram depicting an exemplary alternate embodiment of a RTOS infrastructure 600 for RTOS performance monitoring. With simultaneous reference to FIGS. 5 and 6, FPGA 100 of FIG. 5 and RTOS infrastructure 600 of FIG. 6 are further described.

ICAP 500 provides a dynamic reconfigurable interface to configurable logic, and more particularly to configuration memory, used to instantiate performance monitors 201. ICAP 500 may be coupled to processor 211 by processor interface bus 502, and to a read side of FPGA fabric 220 via processor interface bus 502. ICAP 500 may be coupled to a write side of FPGA fabric 220 via an ICAP bus 512.

A virtual file system ("VFS") layer 605, which is a software layer that is part of RTOS kernel 404, is interposed between the scheduler 402 and device driver 612 to ICAP 500. In this embodiment, scheduler 402 may use VFS files and directories that represent performance monitor circuits.

Because an ICAP 500 facilitates access to configuration design status, such as for a user design 203H, as well as state and configuration status of each performance monitor 201, a VFS 605 is provided to processor 211, and more particularly to real-time scheduler 402 of RTOS infrastructure 600 for execution on processor 211. VFS 605 includes a hierarchy of directories, which may include subdirectories. These directories or subdirectories, namely folders or subfolders, respectively, may include files. These files provide specific information to a performance monitor which may be viewed visa vis software.

A VFS device driver 612, which may be substantially similar to RTOS monitor device driver 405 of FIG. 4, is used. VFS device driver 612 is a file system driver, such as RTOS monitor device driver 405, that is layered on top of a known ICAP driver. VFS device driver 612 may use services of the ICAP driver on which it is layered to access configuration memory and implement mapping from that configuration data accessed in such configuration memory into files and directories that forming at least a portion of a performance monitor region of a VFS directory hierarchy.

Figure 7:
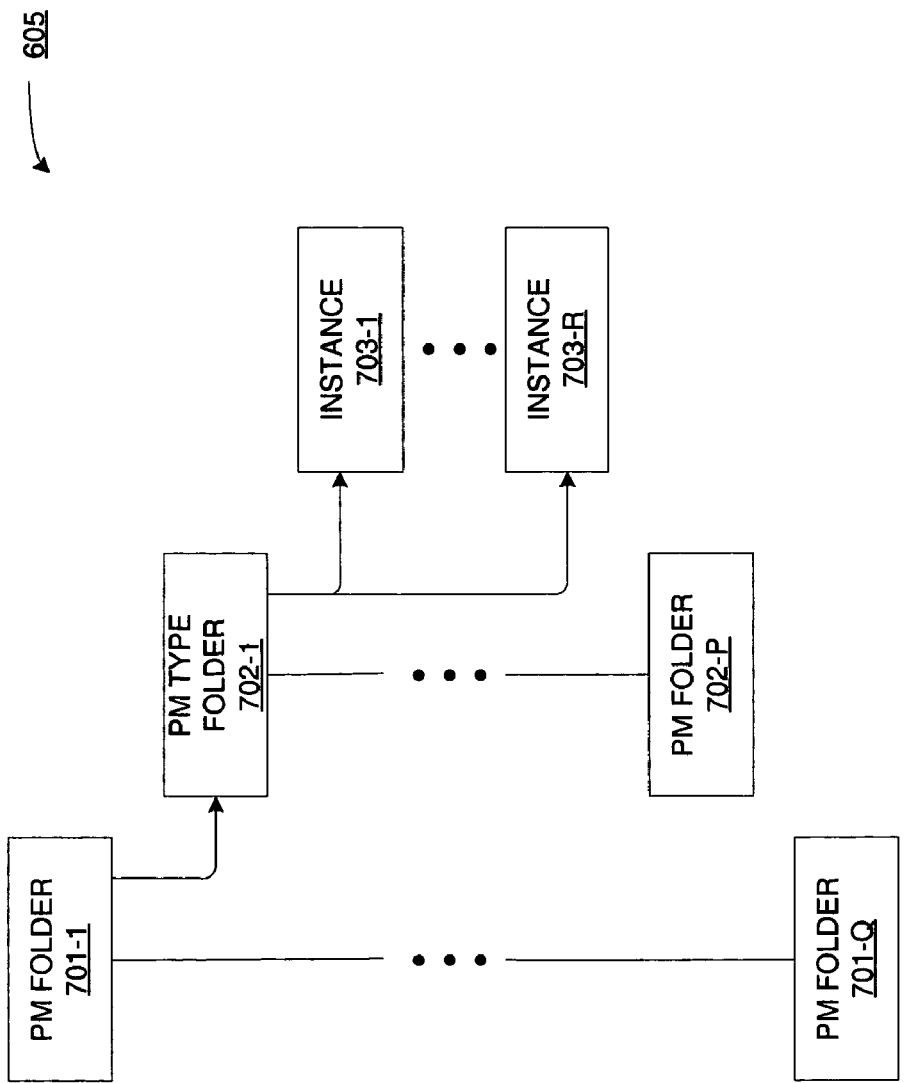
FIG. 7 is a block diagram depicting an exemplary embodiment of a virtual file system ("VFS").

FIG. 7 is a block diagram depicting an exemplary embodiment of a VFS 605. VFS 605 may include performance monitor genus folders 701-1 through 701-Q, for Q a positive integer. Each performance monitor genus folder 701 may include one or more performance monitor species or type folders 702-1 through 702-P, for P a positive integer. Lastly, each performance monitor species folder 702 may include one or more performance monitor instance files 703-1 through 703-R, for R a positive integer.

Thus, a textual view as to performance monitors 201 is provided in this hierarchical data structure, where files provide specific information such as state and configuration of each performance monitor 201. Additional details regarding VFS 605 may be found in a co-pending U.S. patent application Ser. No. 10/812,643 filed Mar. 29, 2004 entitled "Virtual File System Interface to Configuration Data of a PLD," by Adam P. Donlin et al, which is herein incorporated by reference. Accordingly, a user may inspect instance files 703 to determine what values they hold, what trigger points they have, what trigger thresholds they may have, among other performance monitoring types of information.

Therefore, it should be appreciated that a performance monitor may be instantiated and accessed via ICAP 500 for communication of a VFS 605 instance file to processor 211. Data collected from performance monitors 201 is converted into a VFS, where the software driver for ICAP 500 provides services to VFS driver 612 for this conversion. The VFS obtained may provide state and configuration of each performance monitor. This VFS view of performance monitors 201 may be presented to RTOS kernel 404 with a view of configuration data of performance monitors 201. Notably, such performance monitors files and directory structures are presented, which are architected specifically to represent performance monitors 201 existing in hardware, though provided as a software view thereof.

It should be appreciated that performance monitors 201 may be application specific. Moreover, such performance monitors may be tailored for an application, and values associated with those performance monitors may be dynamically changed vis á vis ICAP 500 to change, for example, trigger points or trigger thresholds. This may be contrasted with conventional performance monitors, such as watchdog timers, which are not application specific.

It should be appreciated that kernel 404 may use data obtained from VFS 605 to determine whether or not application process threads 203S have reached a deadline, encountered an error for a set of threads, and other associated activities with RTOS kernel operation. Thus, a kernel could reset or adjust performance monitors 201 dynamically via ICAP 500.

Heretofore, performance monitors were conventionally limited to general monitoring, however, one or more performance monitors 201 may be tailored to a specific application and more particularly to a particular portion of such application. Thus, application-specific performance monitors 201 may provide more characteristic data, including timing information, for characterizing a system. Notably, performance monitors 201 do not need to populate statistics internal to FPGA 100, but such calculation may be pushed out to a computer coupled to FPGA 100.

Figure 8:
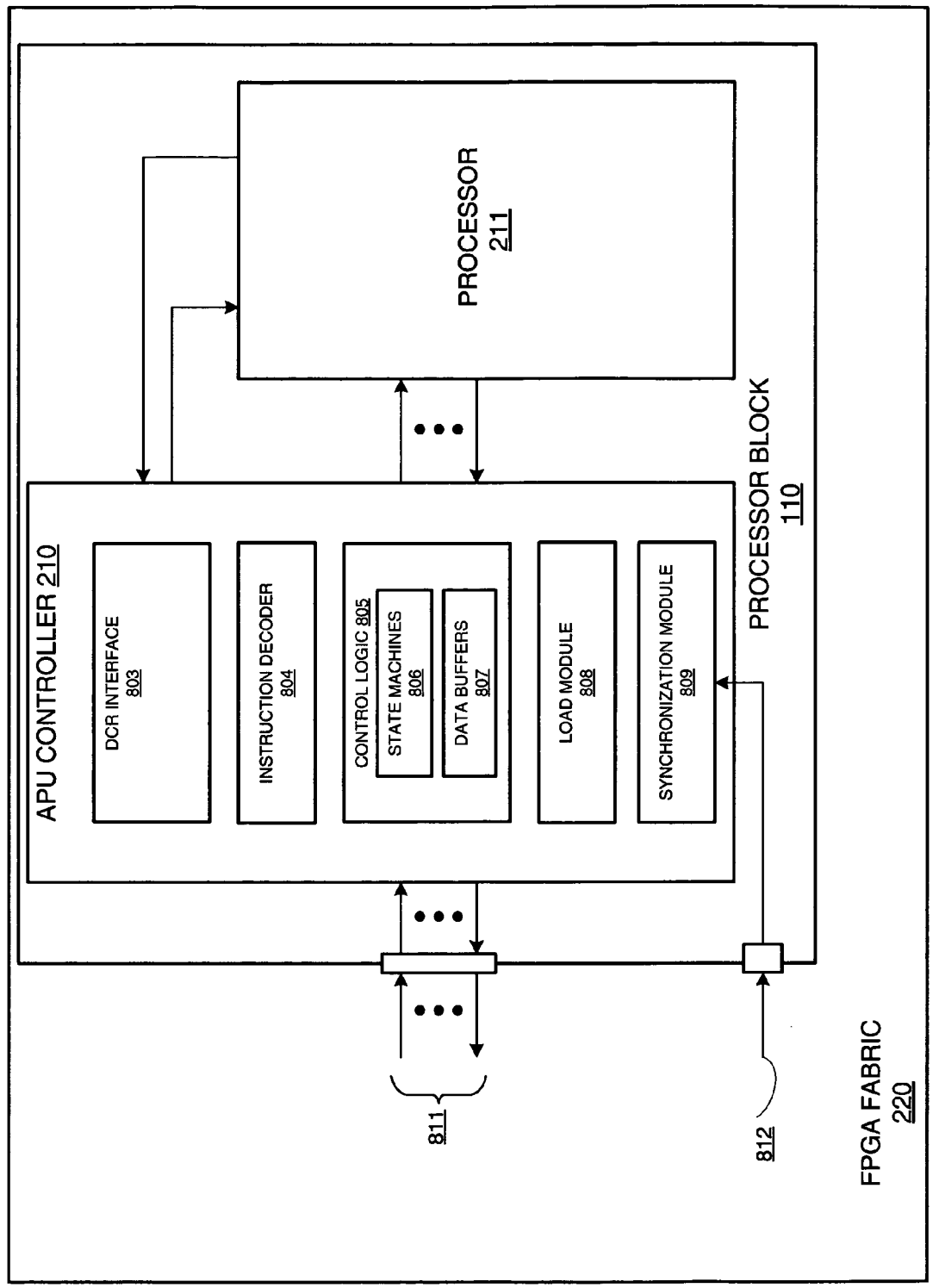
FIG. 8 is a simplified block diagram depicting an exemplary embodiment of an auxiliary processing unit ("APU") controller coupled to a processor.

FIG. 8 is a simplified block diagram depicting an exemplary embodiment of APU controller 210 coupled to processor 211. APU controller 210 and embedded processor 211 may be co-located in a processor block 110, which may be located in FPGA fabric 220.

APU controller 210 is composed of five sub-modules: a control logic block 805, decoder 804, load module 808, device control register ("DCR") interface 803, and synchronization module 809. Notably, a DCR interface is for a PowerPC 405 core, and accordingly other known interfaces may be used.

Control logic block 805 includes state machines 806 and hand shaking logic, such as data buffers 807, for communication to and from processor 211 and coprocessor module instantiated in FPGA fabric 220. Decoder 804 includes decode logic for floating point unit ("FPU") instructions and user-defined instructions. Load module 808 includes logic for loads.

DCR interface 803 includes logic for reading and writing from and to DCR registers of processor 211 for APU controller 210. In an embodiment, DCR registers are used for user-defined instructions and as control bits for APU controller 210. Synchronization module 809 generates a pulse thereby letting APU controller 210 know the timing of the next positive edge of a FPGA fabric coprocessor module clock signal 812.

Thus, APU controller 210 provides an interface 811 for communication with FPGA fabric 220.

While the foregoing describes exemplary embodiment(s) in accordance with one or more aspects of the invention, other and further embodiment(s) in accordance with the one or more aspects of the invention may be devised without departing from the scope thereof, which is determined by the claim (s) that follow and equivalents thereof. Claim(s) listing steps do not imply any order of the steps. Trademarks are the property of their respective owners.

What is claimed is:

1. A system in an integrated circuit for real-time performance monitoring, comprising:

performance monitors instantiated in programmably configurable resources of the integrated circuit;

the programmably configurable resources including configuration memory;

the configuration memory programmed for instantiation of the performance monitors;

an embedded processor comprising a pipeline;

an auxiliary processing unit coupled to the performance monitors, the auxiliary processing unit being in the integrated circuit, the auxiliary processing unit being a controller for interfacing to the pipeline of the embedded processor and observing instruction sequences to facilitate real-time performance monitoring by decoding predetermined instructions flowing through the pipeline;

the embedded processor located in the integrated circuit and coupled to the auxiliary processing unit, the auxiliary processing unit coupled to obtain real-time execution status of an instruction as the instruction is being processed in the pipeline of the embedded processor including prior to exit from a final stage thereof, the auxiliary processing unit configured to provide the execution status of the instruction to the performance monitors for the real-time performance monitoring;

the performance monitors coupled via dedicated wiring to a decode stage and an execution stage of the pipeline of the embedded processor via the auxiliary processing unit for dynamic instruction stream analysis;

the dynamic instruction stream analysis including data gathering for statistical analysis including for Real-Time Operating System statistics; and the performance monitors being partitioned for per-clock cycle or per-instruction monitoring for the dynamic instruction stream analysis.

2. The system, according to claim 1, further comprising application memory coupled to the embedded processor, the user design including at least one real-time thread stored in memory, the at least one real-time thread including the instruction.

3. The system, according to claim 2, wherein the at least one real-time thread is executed responsive to a Real-Time Operating System kernel, the Real-Time Operating System kernel including a scheduler for scheduled execution of the at least one real-time thread responsive to output from a performance monitor of the performance monitors.

4. The system, according to claim 3, wherein the at least one real-time thread is from a partitioned application of the user design, the performance monitor being a Real-Time Operating System performance monitor for monitoring the at least one real-time thread.

5. The system, according to claim 4, wherein the Real-Time Operating System performance monitor is synthesized for instantiation in the programmably configurable resources.

6. The system, according to claim 5, wherein the at least one real-time thread includes performance monitoring code.

7. The system, according to claim 3, wherein the performance monitor is driven responsive to a device driver, the device driver configured to read from and write to the configuration memory used to instantiate the performance monitor.

8. The system, according to claim 3, wherein the scheduler is configured for at least one of inspecting, manipulating, or resetting data accumulated in the performance monitor under control of a device driver.

9. The system, according to claim 8, wherein the integrated circuit device is a single Field Programmable Gate Array.

10. The system, according to claim 8, further comprising an internal configuration access port coupled to the programmably configurable resources and to the embedded processor, the internal configuration access port configured to facilitate internal reconfiguration of the configuration memory of an integrated circuit device during operation thereof.

11. The system, according to claim 10, wherein the Real-Time Operating System kernel includes a virtual file system layer.

12. The system, according to claim 11, wherein the virtual file system layer is interposed between the scheduler and the device driver, the device driver including an internal configuration access port driver, the device driver configured to use services of the internal configuration access port driver to access the configuration memory via the internal configuration access port and to map configuration data in the configuration memory accessed into files and directories for population of the virtual file system layer.

13. A method for performance monitoring, comprising:
instantiating performance monitors in programmably configurable resources of an integrated circuit;
the programmably configurable resources including configuration memory;
programming the configuration memory for instantiation of the performance monitors;
coupling the performance monitors to an embedded processor located in the integrated circuit via an auxiliary processor unit located in the integrated circuit to obtain processor pipeline execution status, the auxiliary processor unit being a controller for accessing a pipeline of the embedded processor to observe instruction sequences to facilitate real-time performance monitoring by decoding predetermined instructions flowing through the pipeline and to obtain the execution status during processing of a real-time thread;
loading real-time threads into memory;
executing the real-time threads with the embedded processor;
monitoring with the performance monitors the execution status of each of the real-time threads in real-time as executed by the embedded processor including prior to exit from a final stage thereof;
the performance monitors coupled via dedicated wiring to a decode stage and an execution stage of the pipeline of the embedded processor via the auxiliary processing unit for dynamic instruction stream analysis;
the dynamic instruction stream analysis including data gathering for statistical analysis including for Real-Time Operating System statistics; and
the performance monitors being partitioned for per-clock cycle or per-instruction monitoring for the dynamic instruction stream analysis.

14. The method, according to claim 13, further comprising:
scheduling execution of the real-time threads with a scheduler under control of a Real-Time Operating System kernel and responsive to output from the performance monitors; and
driving the performance monitors responsive to a device driver in communication with the scheduler.

15. The method, according to claim 14, further comprising:
accessing configuration memory associated with the performance monitors instantiated;
obtaining data from the configuration memory accessed; and
mapping the data obtained to a virtual file system to hierarchically characterize instances of the performance monitors.

* * * * *